Figures 1, 6:
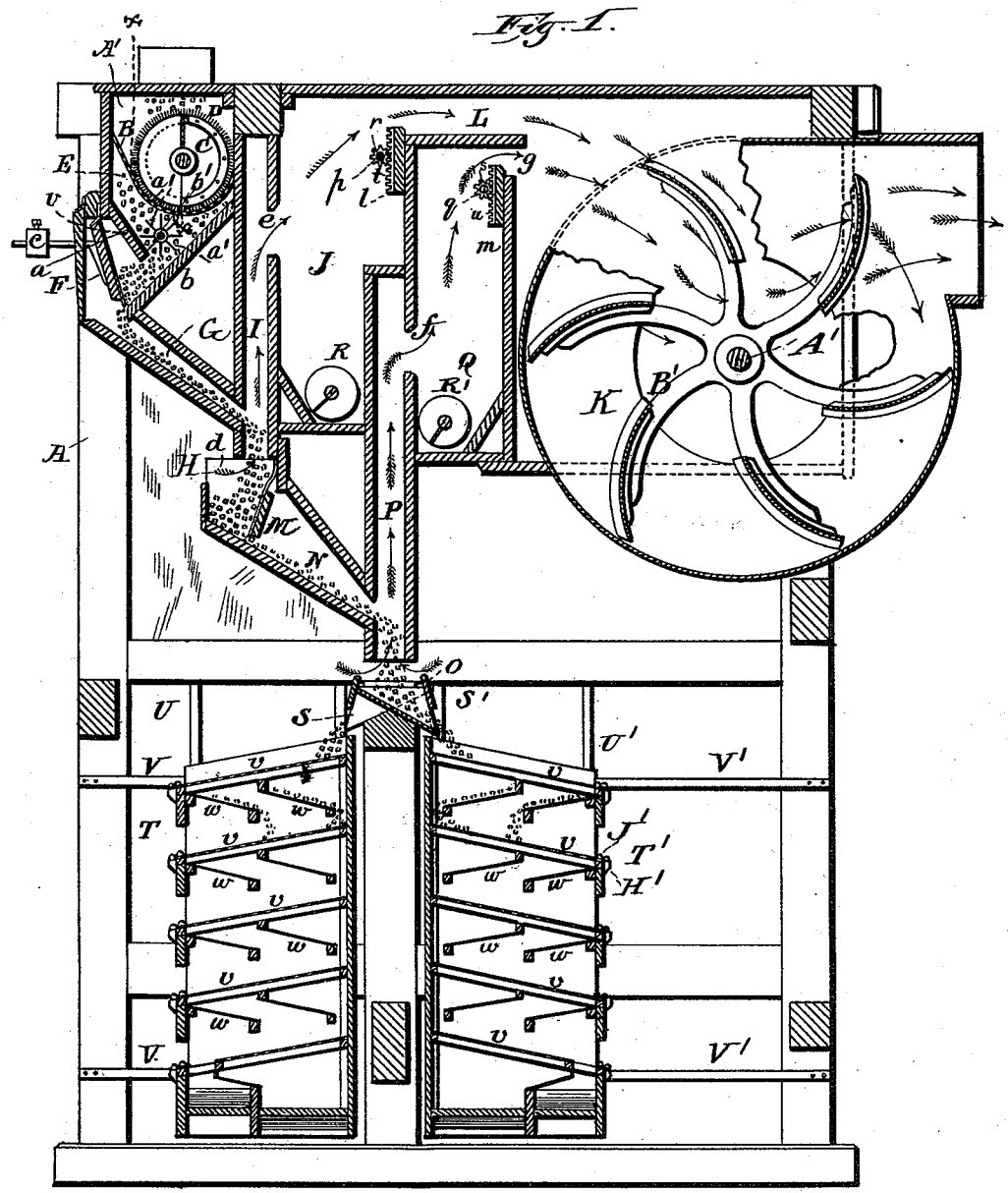

(No Model.) 2 Sheets—Sheet 1.

F. PRINZ.
GRAIN SEPARATOR.

No. 418,587. Patented Dec. 31, 1889.

Witnesses: Inventor:

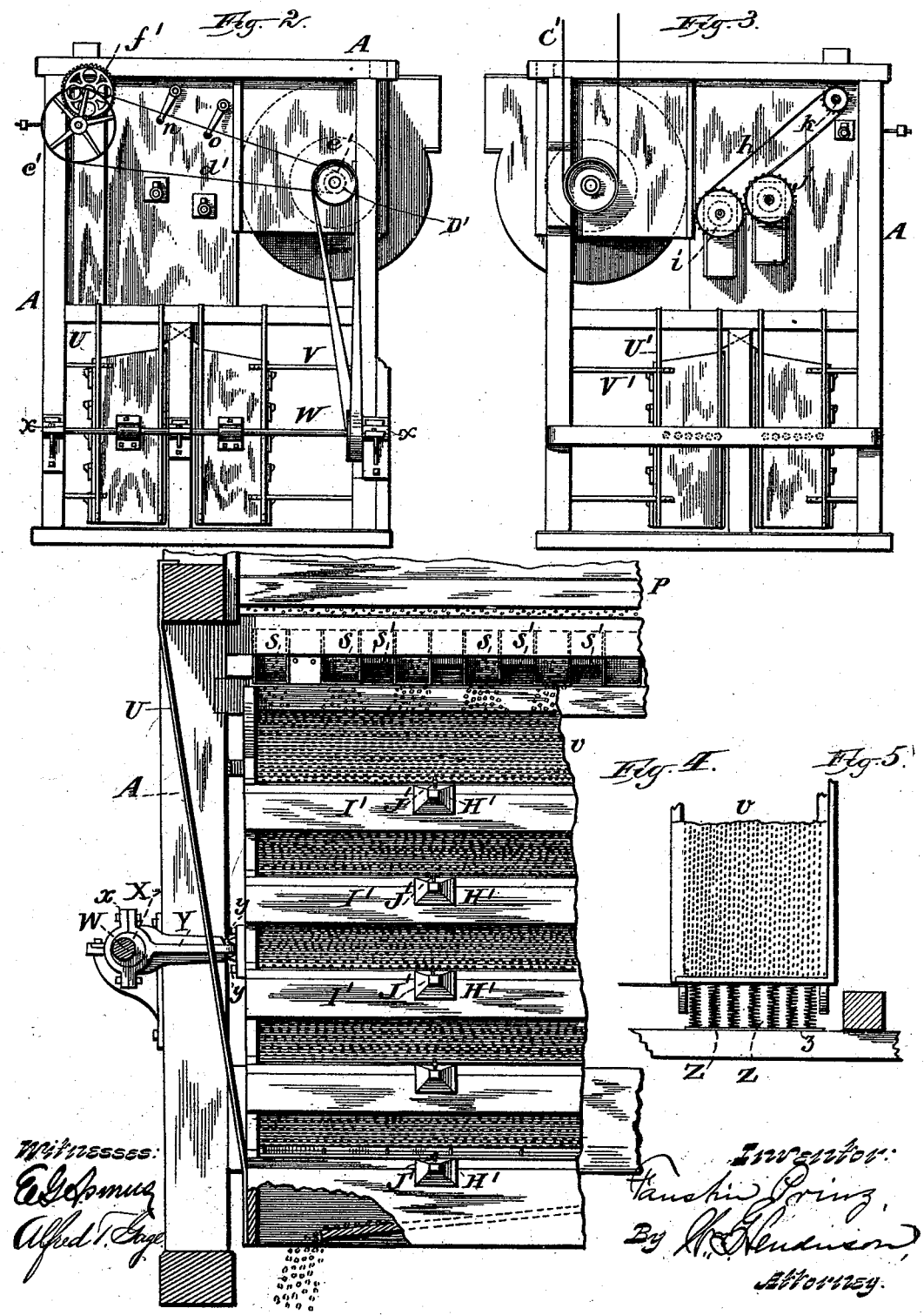

UNITED STATES PATENT OFFICE.

FAUSTIN PRINZ, OF MILWAUKEE, WISCONSIN.

GRAIN-SEPARATOR.

SPECIFICATION forming part of Letters Patent No. 418,587, dated December 31, 1889.

Application filed September 23, 1887. Serial No. 250,478. (No model.)

*To all whom it may concern:*

Be it known that I, FAUSTIN PRINZ, a subject of the Emperor of Germany, residing at Milwaukee, in the county of Milwaukee and State of Wisconsin, have invented certain new and useful Improvements in Grain-Separators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to means for separating wheat and other foreign substances, and has for its object a more thorough and expeditious separation of the foreign substances from the grain by simpler and more efficient means than heretofore; and to those ends and the accomplishment of such other objects as may hereinafter appear the invention consists in the construction and combination of parts hereinafter particularly described, and afterward specifically defined by the claims, reference being had to the accompanying drawings, forming part hereof, and in which—

Figure 1 is a vertical section through a machine illustrating the invention; Fig. 2, a side view looking at the machine from the side where the eccentrics for vibrating the shakers are applied. Fig. 3 is a similar view from the opposite side. Fig. 4 is a view at right angles to Figs. 1, 2, and 3, parts being broken away and others in section, showing the manner in which the grain is fed onto the screens. Fig. 5 is a plan of a portion of one of the screens, showing the application of the springs for pushing back the screens after being moved by the eccentrics. Figs. 2, 3, and 5 are on a smaller scale than the other figures. Fig. 6 is a vertical section on the line $x$ $x$ of Fig. 1 with parts broken away.

In the drawings, the letter A designates the frame-work, which together with the working parts, may be constructed of hard wood.

In the upper part of the machine is a chamber A', having a perforated concave plate or bottom B, extending the width of the machine, and a conveyer having a series of spirally-arranged flights C, which flights may be of any ordinary construction. With the view of keeping the meshes of the perforated plate or bottom clear I provide the edges of the spiral flights with bristles or brushes D, of sufficient strength and stiffness to answer the purpose. The brushes keep the meshes clear, and the spiral causes an even distribution of the material throughout the length of the plate and delivers out of the machine at the end of the chamber all sticks, straw, and other material too large to pass through the meshes of the plate or bottom. Below the perforated plate B is a trough E, formed by the inclined boards $a$ and $b$, and the mouth of the trough is provided with a valve or cut-off F. This valve is pressed by suitable means—say by a weight $c$—to keep the mouth of the trough closed until the weight of the grain in the trough presses it open far enough to permit its escape. This valve also cuts off communication with the trough from below, so that there is no current of air drawn up through the trough from below.

The grain from the trough E is received by an inclined spout G, extending the length of the trough, and by it conducted in a thin stream to another trough H, of the width of the spout, and into which it is discharged. Between the spout G and the trough H is a flue I, of the width of the spout, and which communicates with a settling-chamber J through openings $e$, and having communication with the fan chamber or case K through a flue L. As the grain passes through the flue I from the spout to the trough H it is subjected to a current of air drawn through the opening $d$ to the trough H, and the light particles are drawn up through the flue I and into the settling-chamber J, where the heavier of the light particles are deposited, while the lighter particles are drawn onward into the fan chamber or case. The grain freed from such lighter particles and discharged into the trough H is held there by the automatic valve or shut-off M until its weight is sufficient to press open the valve and pass into the inclined spout N. The cut-off M can be controlled in any well-known way to regulate the feed of the grain, and besides regulating the feed it cuts off the air, so that no air-current is drawn up through the spout into the trough.

The grain passes from spout N to a hopper or trough O, from whence it feeds to the shakers or screens. The spout N and trough O have the width of the trough H, and between them is a flue P, of the width of spout N, so that as the grain passes from the spout to the trough O the lighter particles, which were not taken off by the first current, are taken off by the air-current through the second flue P and carried into the settling-chamber Q, with which the flue communicates through opening $f$. The heavier of the light particles settle in the chamber Q, and the lighter particles are carried by the air-current into the fan-case through the orifice or opening $g$.

It will be observed that by arranging the troughs, valves, spouts, and flues as described the air-current is excluded from passing up through the spout into the troughs and is caused to act on the grain flowing in a wide thin stream at the bottom of the spout, with the result of a more perfect separation of the light and foreign substances from the grain. The particles that settle in the chambers J and Q are removed therefrom by the conveyers R and R', located in the bottom of the chambers and having motion transmitted thereto through a belt $h$, passing around the pulleys or sprocket-wheels $i$ and $j$ of the conveyers and deriving its motion from a pulley $k$ on the shaft of the conveyer C.

The exit-openings to the chambers J and Q are controlled each independent of the other by the valves $l$ and $m$, operated by suitable means by cranks or handles $n$ and $o$ on shafts $p$ and $q$, carrying pinions $r$ and $s$, engaging teeth $t$ and $u$ on the valves.

I have shown and described two spouts, troughs, flues, and settling-chambers; but it is obvious that the number may be varied without departing from the invention.

The trough O, which receives the grain from the last spout, is divided into a number of chambers or pockets S and S' throughout its length to receive the grain as it falls therein, the pockets being arranged so as to deliver on opposite sides of the trough, so that the grain will be divided after passing from the last hopper and be delivered part to one shaker or sieve and part to another. The preferred arrangement of the pockets is such that every alternate one will deliver to one sieve and the alternating ones to the opposite screens. By dividing the trough O, or "receiving-board," as it may be termed, so as to direct the grain to opposite sides, the grain is divided and caused to spread in nearly equal quantities to the two shaking-shoes in wide thin sheets or streams, so that it can be more thoroughly screened.

The two shaking shoes are designated by the letters T and T', and are each suspended from the frame-work by straps U and U' and steadied by cross-straps V and V'. Each shoe contains the inclined sieves or perforated plates $v$ and the imperforate plates $w$, inclining in the opposite direction. The perforated plates screen the grain in the usual way, while the imperforate plates carry toward the upper end of the next lower sieve the grain that has fallen through the upper sieve. By such arrangement a more thorough screening is effected than otherwise attainable, and the grain that passes off from the lower sieve of the series may be passed to a cockle-machine. I prefer to use two backwardly-inclined imperforate plates, but do not limit myself thereto, as more or less may be employed. A vibratory movement is imparted to the shoes by means of a shaft W, journaled in suitable boxes $x$, and having eccentrics X, which act through arms Y on the shoes, the inner ends of the arms preferably fitting between the studs $y$ on the shoes, and the eccentrics so arranged that they will act at different times on the shoes—that is, so as to move the shoes in alternation, so that when one is moved forward the other is moved backward. The shoes at the opposite ends of the eccentrics are acted on by one or more springs, preferably a series of spiral springs Z, bearing at one end against the shoes and at the other against the cross-bar $z$. Under such arrangement when the shoes are moved in one direction by the eccentrics and the latter retracted the springs will press back the shoes, so that thus a vibratory motion is imparted. By moving or vibrating the shoes in alternation a steadier motion is given to the machine.

Each sieve of the two shoes is composed of the perforated plate and its frame, and is set into the shoe and removable therefrom, so that one sieve can be substituted for another. A block H' is secured to each cross-bar I' of the shoe and projects or extends above the top of said bar, and is provided with a button J', so that when the sieve is set in place the front of its frame will lie inside of the block H', as shown in Figs. 1 and 2, and the rear of it against the back wall of the shoe, and by turning the button it will lie across the top of the front of the sieve-frame and thus hold the sieve securely in place.

It may here be stated that for some purposes the perforated bottom B may be omitted and only the conveyer used. In such cases the space above the bottom and the trough will be in one, or form one chamber or trough, and the conveyer may be made of a suitable size to most efficiently discharge its function. It will extend the whole length of the trough or chamber and carry the sticks and straw and like material out of the chamber at its end, while the grain, freed therefrom, will pass out of the trough controlled by the automatically-operating valve in the same manner as when the bottom B is used.

In treating some kinds of grain—barley, for instance—it is desirable to have some means for breaking off the long beard from the grain. For that purpose I employ a beater in the trough E. This beater consists in a series of fingers $a'$, projecting from a shaft $b'$, to the outer end of which is a pulley $c'$, deriving motion through a belt $d'$ from a pulley $e'$ on the shaft $A'$ of the fan-blades $B'$. The shaft $b'$ also has a pinion on it, (not shown,) with which meshes a cog-wheel $f'$ on the shaft of the conveyer C, and by which motion is transmitted to the conveyer. By the beater revolving in the trough E, which is always filled with grain, the beard on the grain is beaten off; but instead of using the beater described the conveyer above the perforated concave bottom may be revolved at such a high speed that the grain will be carried around the chamber $A'$ by the conveyer-flights, and thus delay the passage of the grain and beat the beard therefrom before it escapes.

The machine is put into operation by power derived from any suitable source and transmitted through a belt $C'$ to pulley $D'$ on the fan-shaft $A'$, and thence to the other parts by the several means already described. Motion is also transmitted from the fan-shaft through pulleys $E'$ and $F'$ and belt $G'$ to the eccentric shaft W.

Having described my invention and set forth its merits, what I claim is—

1. The combination of the chamber $A'$, the perforated concave plate, the conveyer-flights arranged above said plate, the trough below said plate, and the automatically-operating valve or cut-off to said trough, substantially as described.

2. The combination, with the chamber $A'$ and means therein for separating foreign matter from the grain, of the trough below said chamber, an automatically-operating valve or cut-off to said trough, an inclined spout to receive grain from the trough, an air-flue at the lower end of the spout, and means for creating an air-current through said flue to act on the grain passing from the spout, substantially as described.

3. The combination of the chamber $A'$ and means therein for separating foreign matter from grain, an automatically-valve-controlled trough below said chamber, an inclined spout to receive grain from the trough, an air-flue at the lower end of the spout, a settling-chamber in communication with said flue, and means for creating an air-current through said flue to act on the grain passing from the spout and for conveying matter through the settling-chamber, substantially as described.

4. The combination of the trough or chamber, a conveyer therein for moving the grain, an automatically-acting valve to control the passage of grain from said trough, an inclined spout to receive grain from the trough, an air-flue at the lower end of the spout, and means for creating an air-current through said flue to act on the grain passing from the spout, substantially as described.

5. In a machine for separating foreign substances from grain, the combination of a trough, the automatic valve F, to prevent the entrance of air into the trough and regulate the feed of the grain therefrom, an air-flue, the inclined spout interposed between said trough and flue and inclining from the delivery-mouth of the trough to its discharge-opening in the lower part of the said air-flue, and means for creating an air-current through said flue, substantially as and for the purposes set forth.

6. In a machine for separating foreign substances from grain, the combination, with two flues, a trough for receiving the material, and an opening for the entrance of air drawn by the suction through the upper flue, of a spout interposed between said trough and lower flue and inclining from the delivery-mouth of the trough to an opening in the lower flue, means for creating a current of air through said flues, and a valve to regulate the flow of the material down said spout and at the same time prevent the air-current through either flue from drawing air from the other flue through said spout, substantially as described.

7. The combination of settling-chambers Q and J, flues P and I, opening into said chambers, the inclined spouts G and M, opening into said flues, and troughs provided with valves and located at the upper ends of said inclined spouts, substantially as and for the purposes set forth.

8. The combination, with the inclined spout and air-flue communicating with the lower end thereof, of a series of shakers or sieves, and a trough or board located between said spout and shakers or sieves and formed into a series of pockets or chambers arranged alternately to deliver to the series of shakers or sieves on opposite sides of said trough or board, substantially as described.

9. The combination of a series of shoes arranged by the side of each other, a trough or board located above the receiving ends of said shoes to deliver a portion of a body of flowing grain to said shoes, and means for moving one shoe in one direction while the other is moved in the opposite direction, substantially as and for the purposes described.

10. In a machine for separating foreign substances from grain, the combination of the scalping-chamber, the perforated concave plate, conveyer-flights arranged above said plate, and a beater for beating the beard from off the grain, substantially as described.

In testimony whereof I affix my signature in presence of two witnesses.

FAUSTIN PRINZ.

Witnesses:
JOSHUA STARK,
GEO. P. MILLER.